United States Patent Office 3,379,717
Patented Apr. 23, 1968

3,379,717
BISMUTH SUBGLYCYRRHIZINATE AND
METHOD OF PREPARING SAME
Cornelis Gerardus Koopman, Boekelo, and René Eugène
J. M. Rutten, Hertogenbosch, Netherlands, assignors
to Rabro Company N.V., Maastricht, Netherlands, a
corporation of the Netherlands
No Drawing. Filed Mar. 27, 1964, Ser. No. 368,433
Claims priority, application Netherlands, Mar. 27, 1963,
290,768
(Filed under Rule 47(a) and 35 U.S.C. 116)
9 Claims. (Cl. 260—210)

Our present invention relates to a new compound, adapted for use in the treatment of certain gastric and duodenal diseases, and to a method of preparing same.

The treatment of various stomach and duodenal symptoms such as hyperacidity, gastritis and duodenal ulcers, by means of medicinal preparations administered orally in tablet or solution form, has frequently been attempted in the past with varying degrees of success. Thus, bismuth compounds, for example bismuth subcarbonate and bismuth tribromophenate, have been used for the treatment of gastroenteritis and peptic ulcer, and licorice (glycyrrhiza) extracts and salts of glycyrrhizin (a component of glycyrrhiza, such as ammonium glycyrrhizinate) have been employed in the treatment of various types of ulcer. However, it has been found that often these substances were ineffective when administered in the recommended doses, while on administration of high doses they gave rise to unwanted and often very dangerous side effects such as, in the case of glycyrrhiza derivatives, edema and salt retention as well as hypertension, and, in the case of bismuth compounds, pain, discomfort and even bismuth poisoning.

We have now found that these undesirable and dangerous side effects may be successfully prevented, with retention of the therapeutic properties inherent in glycyrrhiza as well as in bismuth derivatives, by the utilization of a new compound, bismuth subglycyrrhizinate. This compound may be administered in the form of tablets or pills, or as an emulsion in a suitable liquid, for example as a 20% suspension in water. Further, it has been found in animal experiments that this compound possesses the ability to prevent and heal, in a comparatively short time, ulcers produced experimentally.

According to our present invention the compound bismuth subglycyrrhizinate, which has not heretofore been reported in the literature, is prepared by the reaction of a nitric-acid solution of bismuth nitrate and ammonium glycyrrhizinate. We have discovered that the aforementioned reaction will take place only when bismuth nitrate is in a dissolved state; aqueous suspensions of bismuth nitrate will not react. The required bismuth-nitrate solution in nitric acid may be prepared, for instance, in accordance with the process described in commonly owned application Ser. No. 309,073, filed on Sept. 16, 1963, now abandoned, by dissolving high-purity (99.99%) metallic bismuth chips in 60% nitric acid and diluting the obtained solution to the desired strength. The bismuth-nitrate solution may also be prepared by dissolving solid, commercially available bismuth nitrate in dilute nitric acid.

The ammonium-glycyrrhizinate solution employed in the preparation of bismuth subglycyrrhizinate is a solution of commercially available ammonium glycyrrhizinate in distilled water.

According to the present invention, a dilute nitric-acid solution of bismuth nitrate and a solution of ammonium glycyrrhizinate in distilled water are thoroughly commingled by means of a high-frequency vibrating mixer, such as a vibratile-plate apparatus commercially referred to by the name "Vibromixer" and described, for example, in Dutch Patent No. 75,460. After mixing, the pH of the reaction mixture is adjusted to a value between substantially 4.0 and 5.0, preferably 4.5, and the resulting precipitate of solid bismuth subglycyrrhizinate is separated from the supernatant liquid by filtration or centrifugation, washed with distilled water and an organic liquid such as ethanol, and dried. The chemical analysis of the product obtained in this manner gives numerical values which are in agreement with the formula $C_{41}H_{61}O_{14}COOBi(OH)_2$.

In carrying out the above-described reaction for the preparation of bismuth subglycyrrhizinate it is essential that both reactants, i.e. the bismuth nitrate and the ammonium glycyrrhizinate, be in a completely dissolved state. It is further important that the operation whereby the two reacting solutions are mixed be carried out in as short a time as possible to prevent the slow precipitation, at a low pH value, of a solid whose composition is not that of the desired product, with a consequent decrease in the yield of bismuth subglycyrrhizinate. The above-mentioned high-frequency mixer is eminently suitable for accomplishing this task, and its effectiveness may be further enhanced by first placing one of the solutions, e.g. ammonium glycyrrhizinate, in a vessel of suitable capacity, then starting the mixer and quickly adding the second solution, in this case the nitric-acid solution of bismuth nitrate, to the continuously agitated first solution. The two starting compounds, i.e. bismuth nitrate and ammonium glycyrrhizinate, are advantageously used in about equimolar quantities.

The pH of the reaction mixture obtained in the course of the agitation of the above-mentioned two solutions is between 1 and 3, depending on the concentration of the nitric-acid solution employed. As has been mentioned above, some precipitation occurs already at these pH values; this precipitation, however, proceeds at a slow rate, yielding a product differing in composition from bismuth subglycyrrhizinate whose formation requires the aforementioned pH range of about 4 to 5. It is therefore necessary to adjust the pH of the reaction mixture by the addition of a base, e.g. ammonium hydroxide, before the agitation is stopped. Thereupon the precipitate is separated from the supernatant liquid. This separation may be carried out immediately after attaining the correct pH value, or after an additional period of, say, 10 to 30 minutes during which the agitation of the reaction mixture, containing the precipitate, is continued. In the first case the product is found to consist of relatively large particles; in the second case a very fine powder is obtained.

The product, separated from the supernatant liquid by filtration or centrifugation, is washed with water and an organic liquid such as ethanol, and dried. It is obtained in the form of a light-to-dark-brown powder having the composition $C_{41}H_{61}O_{14}COOBi(OH)_2$. This powder may be mixed with a suitable ingestible filler or carrier, e.g. starch, lactose, talcum or cellulose, and formed into pills, coated tablets, capsules, or emulsions well suited for pharmaceutical applications.

The pharmaceutical preparations containing bismuth subglycyrrhizinate as active ingredient exhibit particularly favorable therapeutic properties in the treatment of gastric and duodenal disorders, such as stomach ulcer. It has been found in animal experiments that bismuth subglycyrrhizinate, when injected into the stomach, effectively promotes the healing of electrically produced gastric ulcers. In one series of experiments, rats were kept in a state of acute fear for a period of 24 hours by the electrification of alternate bars in the bottom of their cages. When an animal touched two of these charged bars it was subjected to an electric shock of about 90 volts and in 24 hours developed severe gastric ulcers exhibiting a clearly hemorrhagic character.

In a preliminary experiment the animals were subjected to electrical shock for 24 hours, then killed on the second, third, sixth and eighth day following the cessation of stimulus. It was found that the ulcers which were clearly of hemorrhagic character on the second day began healing on the third day, but that complete healing required between 6 and 8 days. As a result of these preliminary findings three sets of rats, of which one set was given bismuth subglycyrrhizinate, were subjected to a more thorough investigation.

One set of 7 untreated rats were killed immediately after the cessation of stimulus which had lasted 24 hours; a second set of 7 rats, also untreated, were sacrificed 72 hours following the cessation of stimulus. A third set, comprising 14 rats, were administered two gastric injections of 3 ml. each of a 20% aqueous emulsion of bismuth subglycyrrhizinate twice daily for two days, and killed 72 hours after the cessation of the stimulus. Examination of the stomachs of these three sets of rats revealed the following: In the case of untreated rats, killed immediately after the application of electric current, a large number of hemorrhagic ulcers were found. In the case of untreated rats killed 72 hours after the termination of the stimulus, about 50% of the ulcers were found to be in the process of healing, while the majority of those remaining still exhibited a hemorrhagic character. In the case of rats treated with bismuth subglycyrrhizinate no hemorrhagic ulcers were present any longer, and the healing of ulcers was found to have progressed to a point which is usually attained in the case of untreated animals after a period of 6 to 8 days, as had been found in the above-mentioned preliminary experiments.

On the basis of these experiments it is clearly established that bismuth subglycyrrhizinate possesses a marked therapeutic effect in accelerating the healing of gastric ulcers.

Example I 83.9 g. (0.1 mole) of ammonium glycyrrhizinate is dissolved in 1500 ml. distilled water and transferred to a vessel equipped with a high-frequency vibrating mixer. In a separate container 48.5 g. (0.1 mole) of bismuth nitrate is dissolved in 80 ml. 4 N $HNO_3$ and quickly added to the continuously agitated solution of ammonium glycyrrhizinate.

While agitation continues, the pH of the reaction mixture is determined by means of a pH meter; it is found to be between 2.5 and 3.0. Thereupon the pH is adjusted to a value of 4.5 by the addition of 0.1 N aqueous ammonia.

The precipitate is immediately filtered off, washed three times with 50 ml. distilled water and once with 50 ml. 70% ethanol, and then dried at 40 to 50° C. The yield of bismuth subglycyrrhizinate so obtained is 105 g. (theoretical yield 106.5 g.). The compound is a brownish powder having a melting point of 158 to 162° C.; it is tasteless, not hygroscopic, and insoluble in dilute acids, alcohol, ether, chloroform, acetone and carbon tetrachloride.

Chemical analysis.—Found: C, 47.8; H, 6.05; O, 27.2; Bi, 20.1; $Bi_2O_3$, 22.4. Calculated for $$C_{41}H_{61}O_{14}COOBi(OH)_2$$

(molecular weight 1064.96): C, 47.35; H, 5.96; O, 27.05; Bi, 19.63; $Bi_2O_3$, 21.93.

Example II

The procedure given in Example I is repeated with the difference that after adjustment of the pH to a value of 4.5 the reaction mixture is stirred for an additional 20 minutes, and then the precipitate is filtered off. The product, obtained in substantially the same quantity as in Example I, has the same physical properties except for the fact that its particle size is smaller.

The procedures described in Examples I and II may be modified by the use of centrifugation instead of filtration, with nearly the same yield.

Admixture of the product with one or more of the aforementioned carriers will result in a pharmaceutical preparation adapted to be administered orally for the treatment of gastrointestinal lesions.

We claim:

1. Bismuth subglycyrrhizinate having the formula $C_{41}H_{61}O_{14}COOBi(OH)_2$, in the form of a brownish powder having a melting point of 158 to 162° C., said powder being tasteless, non-hydroscopic and insoluble in dilute acids, alcohol, ether, chloroform, acetone and carbon tetrachloride.

2. A method of preparing bismuth subglycyrrhizinate, comprising the steps of admixing an aqueous solution of ammonium glycyrrhizinate with an acidic aqueous solution of bismuth nitrate, agitating the mixture, adjusting the pH of said mixture to a value between substantially 4 and 5, and separating the resulting precipitate from the mixture.

3. A method as defined in claim 2 wherein said precipitate is separated by filtration.

4. A method as defined in claim 2 wherein said precipitate is separated by centrifugation.

5. A method as defined in claim 2 wherein the pH of the mixture is adjusted to a value of substantially 4.5 prior to separation of the precipitate.

6. A method as defined in claim 2 wherein agitation of the mixture upon adjustment of the pH is continued for an interval of approximately 10 to 30 minutes prior to separation of the pricipitate.

7. A method as defined in claim 2 wherein the mixture contains approximately equimolar quantities of ammonium glycyrrhizinate and bismuth nitrate.

8. A method of preparing bismuth subglycyrrhizinate, comprising the steps of dissolving a quantity of ammonium glycyrrhizinate in distilled water, agitating the solution at high frequency, admixing with the agitated solution a substantially equimolar quantity of bismuth nitrate dissolved in dilute nitric acid, continuing the agitation while adjusting the pH of the mixture to a value between substantially 4 and 5, and separating the resulting precipitate from the mixture.

9. A method as defined in claim 8 wherein said precipitate is washed first in distilled water and then in a lower alcohol.

References Cited

FOREIGN PATENTS 948,417  2/1964  Great Britain.

LEWIS GOTTS, *Primary Examiner.*

JOHNNIE R. BROWN, *Assistant Examiner.*